US011914414B2

(12) United States Patent
Brouwers et al.

(10) Patent No.: US 11,914,414 B2
(45) Date of Patent: Feb. 27, 2024

(54) CONTROL DEVICE FOR OPERATING AT LEAST ONE VEHICLE ACTUATOR

(71) Applicant: GRAMMER Aktiengesellschaft, Ursensollen (DE)

(72) Inventors: Bert Brouwers, Sint-Niklaas (BE); Peter De Boeck, Antwerp (BE); Mikhail Ponomarev, Antwerp (BE); Kruthik Kumar Sujith Kumar, Mechelen (BE)

(73) Assignee: GRAMMER AKTIENGESELLSCHAFT, Ursensollen (DE)

( * ) Notice: Subject to any disclaimer, the term of this patent is extended or adjusted under 35 U.S.C. 154(b) by 0 days.

(21) Appl. No.: 17/883,139

(22) Filed: Aug. 8, 2022

(65) Prior Publication Data

US 2023/0041120 A1 Feb. 9, 2023

(30) Foreign Application Priority Data

Aug. 9, 2021 (DE) .......................... 102021120686.3

(51) Int. Cl.
*G05G 9/047* (2006.01)
*B60K 35/00* (2006.01)

(52) U.S. Cl.
CPC ............. *G05G 9/047* (2013.01); *B60K 35/00* (2013.01); *B60K 2370/135* (2019.05); *G05G 2009/04714* (2013.01); *G05G 2009/04766* (2013.01)

(58) Field of Classification Search
CPC .......... G05G 2009/04714; G05G 2009/04766; G05G 5/05; G05G 9/047
See application file for complete search history.

(56) References Cited

U.S. PATENT DOCUMENTS 3,870,161 A * 3/1975 Cording ................. G05G 9/047
212/289
6,002,351 A 12/1999 Takeda et al.
(Continued)

FOREIGN PATENT DOCUMENTS

DE 000001935778 9/1976
DE 10128731 2/2002
(Continued)

OTHER PUBLICATIONS

Official Action for India Patent Application No. 202224044044, dated Mar. 16, 2023, 7 pages.
(Continued)

*Primary Examiner* — Charles A Fox
*Assistant Examiner* — Gregory T Prather
(74) *Attorney, Agent, or Firm* — SHERIDAN ROSS P.C.

(57) ABSTRACT

Control device for operating at least one actuator of a vehicle, the control device comprising a deflectable control lever and a housing module, wherein a first guide element rotatable about a first rotation axis and a second guide element rotatable about a second rotation axis are provided, wherein the first guide element is arranged at a first end of the control lever and the second guide element is arranged between the first end and a second end of the control lever, wherein the housing module has through holes, which are designed as bearing for supporting the guide elements, so that the guide elements can be contacted from outside the housing module, wherein the housing module has a first coupling area on an outer side, wherein the first coupling area comprises a bearing of the bearings and the first coupling area is designed and provided to receive an additional module, which comprises an area formed at least partially complementary to the first coupling area, in such a
(Continued)

way that the additional module can be functionally connected to the guide element.

8 Claims, 6 Drawing Sheets

(56) References Cited

U.S. PATENT DOCUMENTS

| | | | | |
|---|---|---|---|---|
| 11,634,886 B2* | 4/2023 | Krivenkov | ............. | G05G 9/047 |
| | | | | 74/507 |
| 2003/0098196 A1* | 5/2003 | Yanaka | .................. | F16H 61/24 |
| | | | | 180/315 |
| 2008/0275596 A1 | 11/2008 | Tarasinski et al. | | |
| 2009/0295724 A1 | 12/2009 | Cheng et al. | | |
| 2013/0162419 A1* | 6/2013 | Chang | ..................... | A63F 13/24 |
| | | | | 340/407.2 |
| 2020/0385956 A1* | 12/2020 | Krivenkov | ............. | G05G 9/047 |

FOREIGN PATENT DOCUMENTS

| | | |
|---|---|---|
| DE | 102019115329 | 12/2020 |
| EP | 2015160 | 1/2009 |
| EP | 3748459 | 12/2020 |
| JP | 2002-091593 | 3/2002 |
| JP | 2009-015568 | 1/2009 |

OTHER PUBLICATIONS

Official Action with machine translation for German Patent Application No. 102021120686.3, dated May 20, 2022, 8 pages.
Extended European Search Report for European Patent Application No. 22188318.4, dated Jan. 2, 2023, 10 pages.
Official Action (with English translation) for Japan Patent Application No. 2022-116804, dated Nov. 21, 2023, 10 pages.

* cited by examiner

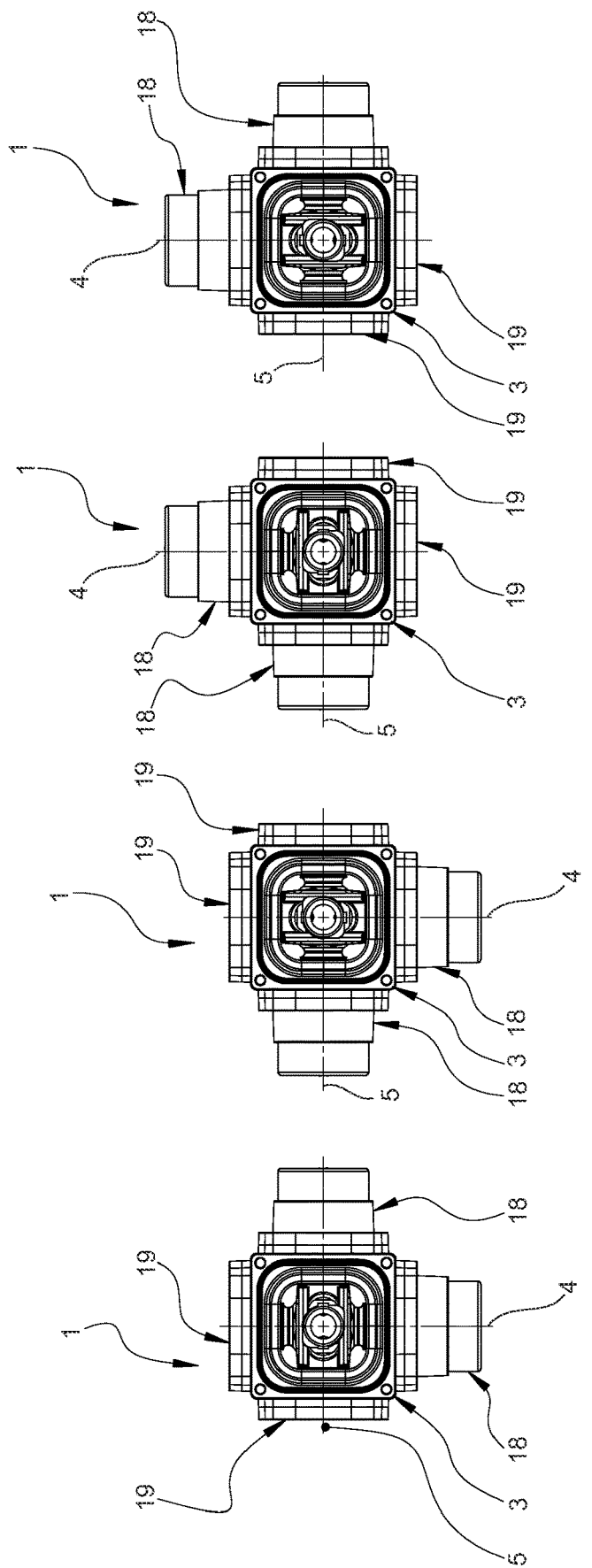

CONTROL DEVICE FOR OPERATING AT LEAST ONE VEHICLE ACTUATOR

CROSS-REFERENCE TO RELATED APPLICATION

This application claims the benefit of German Patent Application No. 102021120686.3 filed Aug. 9, 2021, the contents of which are incorporated herein by reference in its entirety.

FIELD

The invention relates to a control device, preferably a manually operable control device, for operating at least one actuator of a vehicle.

Vehicles which are equipped with several actuators or actuator elements usually have a control system and control elements for controlling these actuator elements. Examples of such vehicles are a forklift truck, a tractor or an excavator. Examples of such actuator elements are drives which are, for example, hydraulic, pneumatic, electronic and/or electromechanical and are provided for the movement of excavator shovels or also controllable valves. Part of the control system is usually an electronic control unit which receives signals from sensors and transmits control signals to the actuator elements.

BACKGROUND

Control elements for the active control of actuator elements are known from the state of the art as so-called joysticks, control sticks or control lever elements, which are similar to a gear lever from a car and can be manually operated by the user of the vehicle (vehicle driver) within the vehicle cabin. These control lever elements are arranged so that they can be moved (swivelled and/or displaced) from an initial position (basic position/home position, neutral position) to the left, right, front and/or rear, for example by the muscle power of the driver.

Due to the fact that the available space for arranging is usually very limited, the control systems of the state of the art are built extremely compactly in order to be able to be designed as space-saving as possible. This is achieved, for example, by arranging different elements of the control system in an overlapping manner to reduce space, i.e. the elements are built into each other but can be functionally separated from each other.

In the event of a malfunction of such a control system, the consequence is therefore that the entire control system must be removed and replaced. Likewise, the control system cannot simply be adapted to different requirements of the vehicle.

SUMMARY

The object of the present invention is to overcome the disadvantages of the prior art, so that, while also requiring little space, an easy and quick adaptation of the control system is possible and faulty components can be quickly replaced.

The task of the invention is solved by a control device with the features of independent claim 1.

The main idea of the invention is to provide a control device for operating at least one actuator of a vehicle, wherein the control device comprises a deflectable control lever and a housing module, wherein a first guide element rotatable about a first rotation axis and a second guide element rotatable about a second rotation axis are provided, wherein the first guide element is arranged at a first end of the control lever and the second guide element is arranged between the first end and a second end of the control lever, wherein the housing module has passage openings, which are designed as bearing points for bearing the guide elements, so that the guide elements can be contacted from outside the housing module, the housing module having a first coupling area on an outer side, the first coupling area comprising a bearing point of the bearing points, and the first coupling area being designed and provided for receiving an additional module which comprises an area which is designed at least partially complementary to the first coupling area, in such a way that the additional module can be functionally connected to the guide element.

Preferably, the control lever can be deflected from a basic position. It is conceivable that the control lever can be deflected by means of a rotation about the first rotation axis and/or the second rotation axis. A basic position can be defined, for example, as a direction in which the control lever extends perpendicular to the first rotation axis and perpendicular to the second rotation axis.

According to a particularly preferred embodiment, the first rotation axis and the second rotation axis are perpendicular to each other, whereby preferably the first rotation axis and the second rotation axis are always perpendicular to each other, i.e. the axes are perpendicular to each other regardless of a deflection of the control lever.

The control lever can preferably be deflected in all directions starting from the basic position. The control lever can thus preferably undergo a deflection about the first axis and/or a deflection about the second axis, both in terms of a positive rotation (corresponding to a forward rotation) and a negative rotation (corresponding to a backward rotation) about the respective axis. Furthermore, a superposition of the described deflections is preferably possible. Further preferably, all of the displacement movements mentioned are possible in an infinitely variable manner.

The housing module is preferably cube-shaped or cuboid-shaped. Preferably, the housing module has at least four side walls, each of the sides having one, preferably exactly one, through hole. Further preferably, two side walls are arranged parallel to one another in each case, preferably two side walls being formed parallel to the first rotation axis and two side walls being formed parallel to the second rotation axis.

Preferably, the first guide element and the second guide element form a cardan joint.

According to the invention, it is provided that the first guide element is arranged at the first end of the control lever, which is rotatably mounted about the first rotation axis and forms a first guide link, by means of which the rotation of the control lever element about the first rotation axis can be limited to a specific first angular range.

Furthermore, it is advantageous if the first guide element forms a bearing for a rotary bearing of the first end of the control lever. For example, the first guide element has a bore passing through the guide slot. For example, the first end of the control lever also has a bore. Preferably, both bores are arranged in alignment with each other, whereby a rod element is arranged within the two bores, around which the control lever is rotatably arranged and which is preferably rigidly connected to the first guide element. Thus, by means of the first guide element and the rod element, for example, a pivot bearing of the control lever is formed, which further reduces the space requirement of the control device.

Furthermore, it is provided that the second guide element is arranged between the first end of control lever and the second end of control lever, which is rotatably mounted about the second rotation axis and forms a second guide slot by means of which the rotation of the control lever about the second rotation axis can be limited to a specific second angular range.

Preferably, the second guide element is arranged such that it at least partially overlaps the first guide element in the height direction of the control device. For example, the second guide element forms an arc shape at least in sections, wherein a virtual centre axis of the associated arc is arranged parallel to the second axis and/or intersecting the first guide element. This arrangement also reduces the required installation space.

According to the invention, the guide elements are supported by means of bearings of the housing module, wherein a first and a second bearing are provided in each case. For example, the first and/or the second bearing comprises a rolling bearing connection.

According to the invention, through holes of the housing module form bearings for supporting the guide element. Since the bearings are through holes in the housing module, the guide elements can be connected from outside the housing module, according to the invention with an additional module.

In accordance with the invention, it is further provided that a first coupling area is provided which comprises a bearing point of the bearing points, preferably comprises exactly one bearing point. The first coupling area is designed and intended to at least partially receive the additional module, wherein the additional module is designed to be at least partially complementary to the first coupling area. According to the invention, the additional module can be functionally connected to the guide element, i.e. the additional module can act on the corresponding guide element, in particular can act directly.

It is particularly preferred that a first coupling area and a second coupling area are provided, wherein the first coupling area and the second coupling area comprise the bearings of the first guide element or the second guide element.

It is particularly preferred that a first coupling area, a second coupling area, a third coupling area and a fourth coupling area are provided, wherein the first coupling area and the second coupling area comprise the bearings of the first guide element and the third coupling area and the fourth coupling area comprise the bearings of the second guide element.

Regardless of the number of coupling areas, each coupling area can accommodate an additional module.

According to a particularly preferred embodiment, it is provided that the additional module is one selected from an actuator module and a reset module, wherein the actuator module is designed to apply a torque to one of the axes of rotation, and wherein the reset module is designed to apply a force to one of the axes of rotation in order to counteract a deflection of the control lever.

By means of an actuator module, it is possible to actively control the control lever indirectly, namely via the actuation of a rotational axis or a guide element, and/or to control it in a programmed manner, i.e. a force or a torque can be applied to the control lever element without the influence of the driver's muscle power. This technique is also known as "force feedback".

A force and/or a moment can therefore be transmitted to the control lever by means of the actuator module, which has the effect of a vibration and/or displacement of the control lever, for example. A vibration can be a temporal sequence of small displacements.

By means of the actuator module, a moment can be applied on the one hand in the direction of rotation or against the direction of rotation, so that this moment can support or counteract the movement.

Particularly preferably, an actuator module can be used to block the control lever with regard to rotation about one axis of rotation or about both axes of rotation.

According to a preferred embodiment, it is provided that the actuator module comprises a drive unit and an output unit. Further preferably, the actuator module forms a motor-gearbox combination. Particularly preferably, the output unit is a planetary gear and the drive unit is an electric motor.

The electric motor is preferably a torque motor, so that a high torque can be achieved at low speeds.

To support the compact design of the control device, it is advantageous if the planetary gear comprises a rotatably mounted sun gear, a ring gear radially surrounding the sun gear, and a plurality of, preferably three, planetary gears arranged radially between the sun gear and the ring gear and toothed therewith. Preferably, the sun gear is arranged in each case in alignment with one of the axes of rotation and is rotatably mounted about this.

For example, the modulus of the sun gear, the ring gear and the planetary gears, i.e. the ratio of the values of the respective pitch circle diameter and the respective number of teeth, each has an identical value from a range of 0.3 mm to 0.7 mm, preferably 0.5 mm.

Preferably, the ring gear is mounted in a fixed position; the output is therefore preferably not via the ring gear. For example, the ring gear has an anti-rotation device by means of which its radial position can be fixed relative to a rest of the actuator module. For example, this anti-rotation device is formed by means of a special first geometry of the ring gear on its outer diameter. For example, this first geometry is designed as at least one, preferably four, flattenings of the outer radius of the ring gear. Preferably, this anti-rotation device is also designed as a second geometry complementary to the first geometry on the rest of the actuator module; for example, flattenings are also formed on an inner radius on the rest of the actuator module, the number and arrangement of which is preferably identical to the number of flattenings of the ring gear.

Preferably, the drive takes place via a shaft of the electric motor or motor (motor shaft) and via the sun gear, whereby a centre axis of the shaft of the electric motor is preferably aligned with a centre axis of the sun gear. Further preferably, the shaft of the motor is in mechanical engagement with the sun gear so that a torque of the motor can be transmitted to the sun gear; preferably, the shaft and the sun gear are rigidly connected to each other. Thus, in particular, a rotation of the motor shaft can be transferred to a rotation of the sun gear that is in the same direction and identical in terms of speed. For example, a connection between the motor shaft and the sun gear comprises a key connection.

However, it is preferable that no separate connection is necessary between the motor shaft and the sun gear. Accordingly, the motor shaft and the sun gear are preferably formed in one piece; for example, the motor shaft and the sun gear are made from a single part and/or a single semi-finished product and are preferably machined ("milled").

For example, at least one or more, preferably all, gear wheels (sun gear, ring gear and/or planetary gears) are made of plastic. Possible plastics are, for example, polyacetal (POM) and/or polyketone (PK).

According to a further preferred embodiment, it is provided that the actuator module comprises an actuator module housing, wherein the actuator module housing is formed from a first actuator module housing part, which can be connected to the housing module, and a second actuator module housing part, wherein the output unit is accommodated inside the actuator module housing and the drive unit is arranged outside the actuator module housing on the second actuator module housing part.

This makes it easy to provide an actuator module that has all the necessary components to apply a torque and/or a force to an axis of rotation. Since the actuator module housing can be connected to the housing module and the control lever, only the actuator module has to be removed if it is defective.

The ring gear of the planetary gear can be an integral part of the first actuator module housing.

Preferably, the reset module is a passive reset module. This means that no active control or regulation of the reset module is provided.

In particular, it is conceivable that when the control lever is deflected from the home position, a force is applied by means of which the control lever can be returned to the home position.

According to a preferred embodiment, it is provided that the reset module comprises a reset module housing, wherein the reset module housing is formed from a first reset module housing part, which can be connected to the housing module, and a second reset module housing part, wherein the reset module comprises a torsion spring element, a torsion spring element support which is rotatable relative to the reset module housing, and a torsion spring element base which is arranged stationary relative to the reset module housing, wherein the torsion spring element is connected to the torsion spring element support and the torsion spring element base.

A rotation of the torsion spring element support relative to the torsion spring element base deflects the torsion spring element, thereby generating a spring force which can be transmitted to one of the guide elements.

Particularly preferably, the torsion spring element support is connectable to one of the guide elements.

Preferably, the torsion spring element is a leg spring, although other types of torsion springs are also conceivable.

This makes it easy to provide a reset module which has all the necessary components to apply a force to an axis of rotation. Since the reset module can be connected to the housing module and the control lever, only the reset module has to be removed if it is defective.

According to a further preferred embodiment, it is provided that the guide elements each have a first bearing section and a second bearing section, wherein the first bearing section of a guide element comprises a first connection area and the second bearing section of a guide element comprises a second connection area. Particularly preferably, the bearing point sections of a guide element are formed identically. Further preferably, the bearing position sections of one guide element differ from the bearing position sections of the other guide element.

Preferably, the respective bearing position section is formed in such a way that it can be received by a bearing. Preferably, all bearings and all bearing sections are identical, which allows a reduction of manufacturing processes. Furthermore, it is not necessary to pay attention to a certain orientation of the guide elements during assembly.

Different connection areas are advantageous if different additional modules are to be provided. It is therefore particularly preferred that the additional module comprises a first additional module connection area which is complementary to the first connection area, or a second additional module connection area which is complementary to the second connection area.

It is thus conceivable that the first connection area is assigned to the actuator module and the second connection area to the reset module, or vice versa. For example, it can be determined that only one actuator module and one reset module can be arranged on a guide element. Accidental mounting of two actuator modules or two reset modules for a guide element can therefore be ruled out, so that malfunctions during operation can be prevented.

It is particularly preferred that the housing module has four through holes and four coupling areas, each comprising a bearing, whereby the first rotation axis extends through two opposite through holes and the second rotation axis extends through the two further opposite through holes.

This means that up to two additional modules can be arranged on each guide element. Such a design of the housing module therefore allows the following arrangements with regard to the housing module:

No actuator module, one actuator module, two actuator modules
No reset module, one reset module, two reset modules,
Any combination of the above.

In the event that no additional module is provided at the corresponding location on the housing module, a blind cover can be provided by means of which the corresponding coupling area can be covered in order to be able to prevent the ingress of dirt, water or the like. Preferably, the blind cover can comprise an area which is at least partially, preferably completely, complementary to the coupling area.

BRIEF DESCRIPTION OF THE DRAWINGS

Further advantages, objectives and features of the present invention will be explained with reference to the accompanying drawing and the following description, in which a control device is illustrated and described by way of example.

The drawings show:

FIG. 5 Various arrangements of the modules in relation to each other.

DETAILED DESCRIPTION

In the figures, identical components are to be understood with the corresponding reference signs. For the sake of clarity, some components may not have a reference sign in some figures but have been designated elsewhere.

Figure 1A:
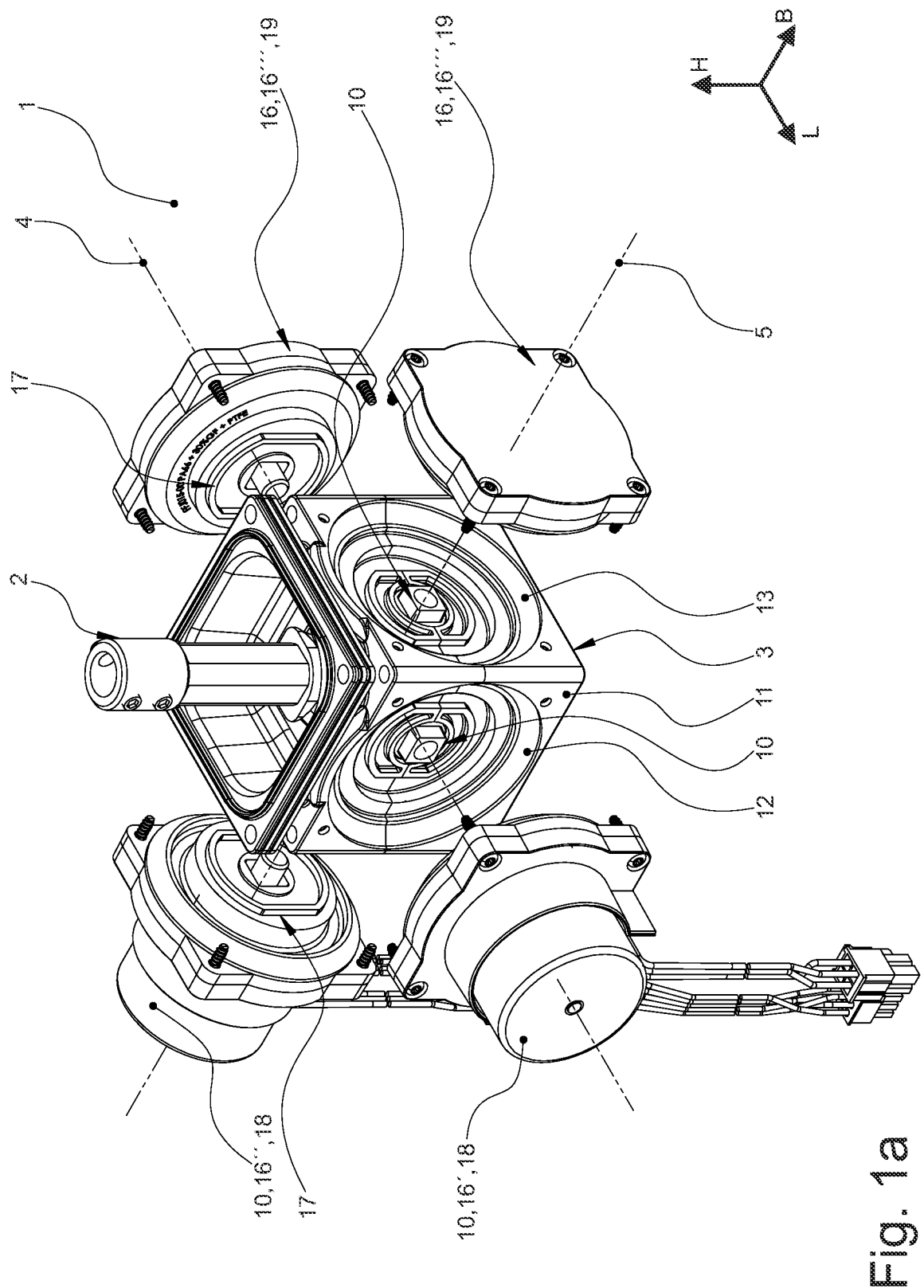
FIG. 1a a control device according to a preferred embodiment.

FIG. 1A shows a perspective view of a control device 1 according to a preferred embodiment. The control device 1 comprises a housing module 3 and a control lever 2, which is only partially shown here. Furthermore, additional modules 16, 16', 16", 16''', 16'''' are shown, whereby a first additional module 16' and a second additional module 16" are designed as an actuator module 18 and a third additional module 16''' and a fourth additional module 16'''' are designed as a reset module 19.

A first coupling area 12 and a second coupling area 13 are also visible, whereby the third coupling area (not shown) and the fourth coupling area (not shown) are concealed by the housing module 3. The coupling areas 12, 13 are designed complementary to the respective additional module 16, so that a good mounting of the additional module 16 is possible. A complementary area 17 of the additional module 16 is provided for this purpose.

Likewise, each coupling area 12, 13 has a through hole 10, which is formed as a bearing 10 for a guide element 6, 7, which is also concealed.

The housing module 3, an actuator module 18 and a reset module 19 are shown and described in more detail in the following figures.

Figure 1B:
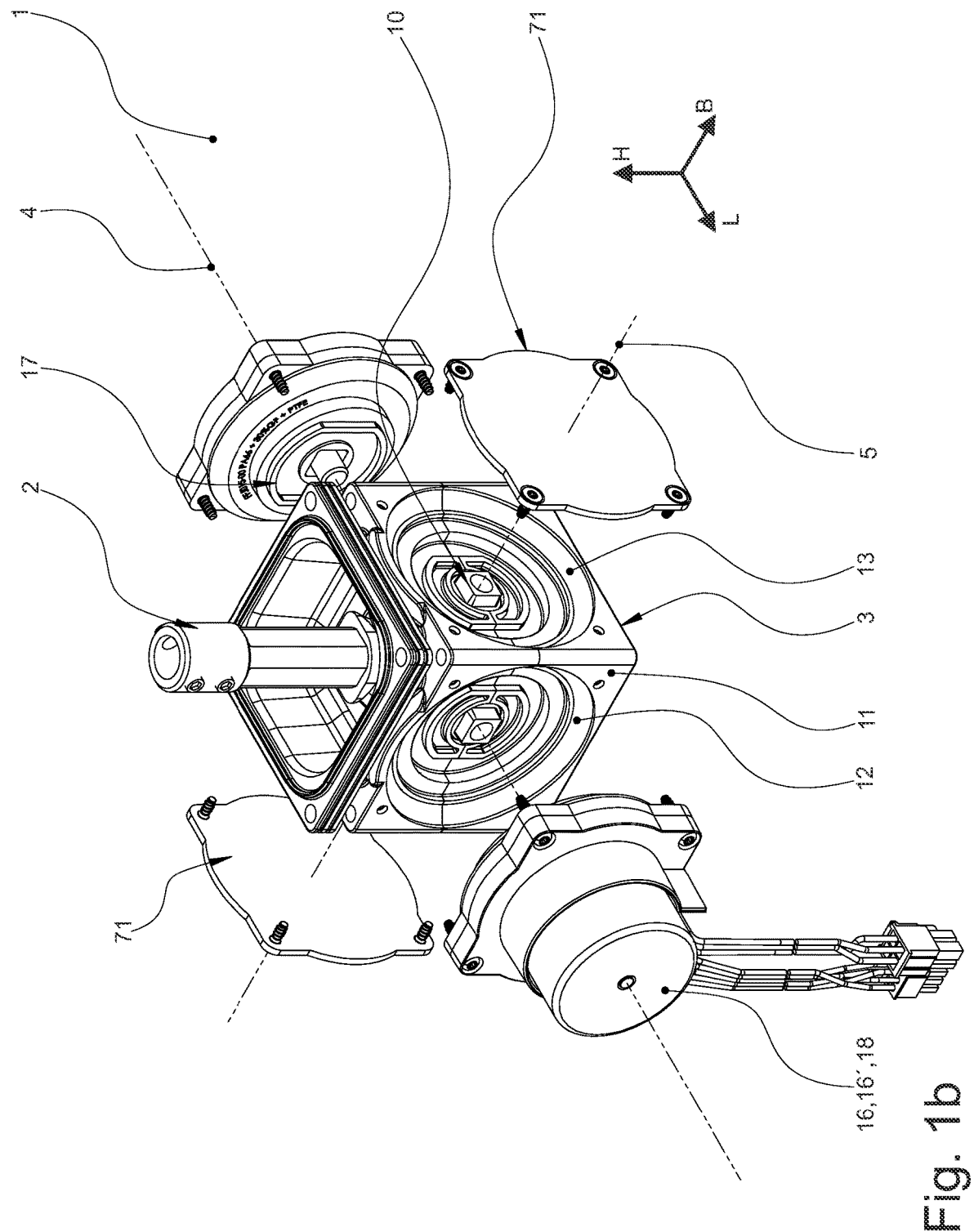
FIG. 1b a control device according to a further preferred embodiment.

FIG. 1B shows a similar design of the control device 1, but an actuator module 18 and the reset module 19 opposite to this actuator module 18 have been removed and replaced by a blind cover 71. As a result, one of the guide elements 6, 7 is provided without external influence, so that no external forces are exerted on the corresponding guide element 6, 7.

Figure 2:
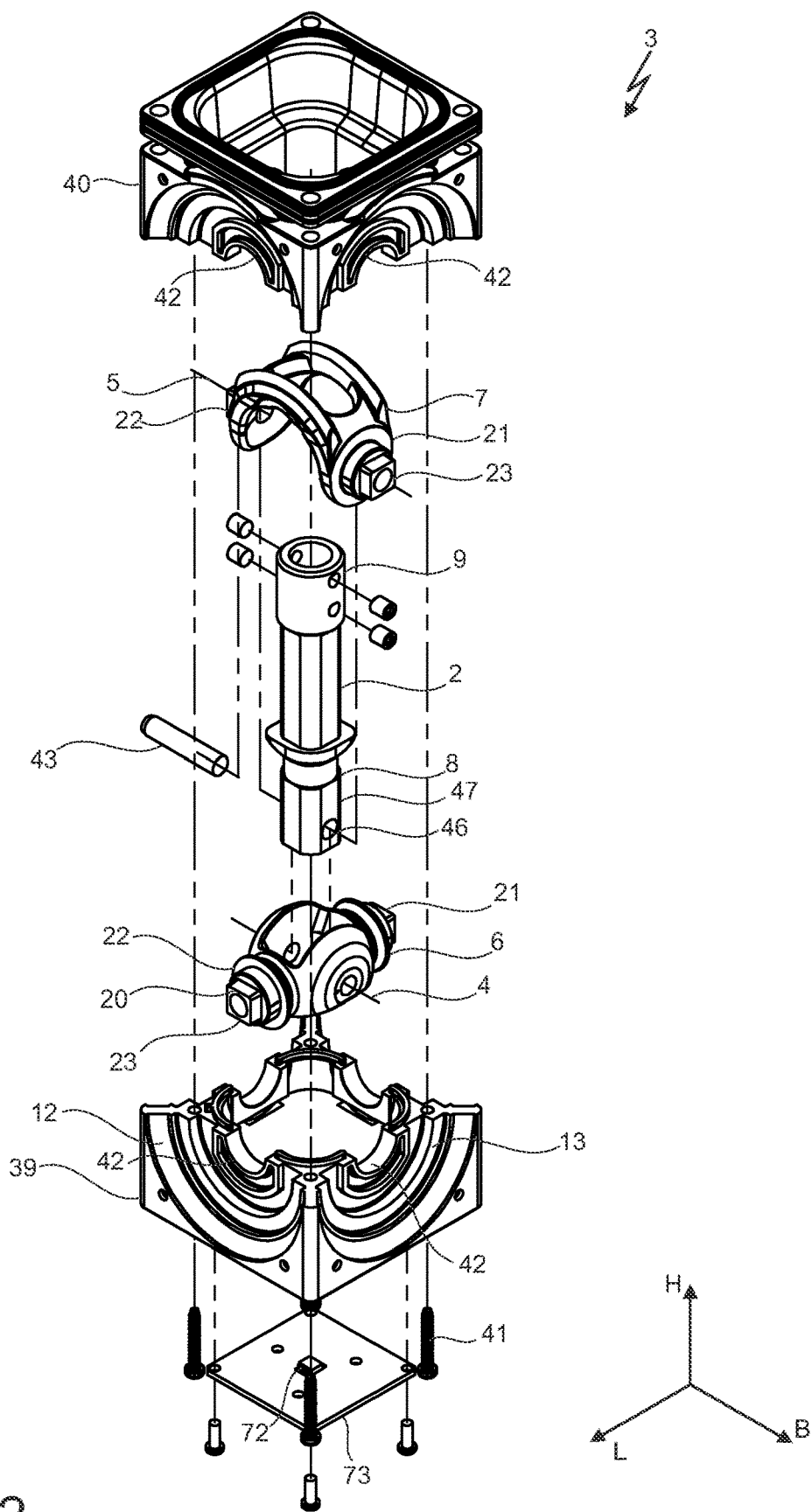
FIG. 2 Housing module of the control device in an exploded view.

FIG. 2 shows the housing module 3 of the control device 1 in more detail according to a preferred embodiment.

Preferably, the housing module 3 consists of a first housing module part 39 and a second housing module part 40, which are preferably connectable to each other by means of screws 41. The housing module parts 39, 40 each have through hole sections 42, which are each formed with respect to the housing module parts 39, 40 in such a way that the through hole sections 42 form a through hole 10. Particularly preferably, all through holes 10 are formed identically. Particularly preferably, a lower cover element 73 can be provided, which is also connected to the first housing module part 39 by means of screws 41, whereby further preferably the cover element can be formed by a PCBA 73, whereby the PCBA 73 has a sensor 72, which is arranged in such a way that it can interact with the magnet 49 and thus an initial position or neutral position can be detected.

Such a design can facilitate the assembly of the housing module, since bearing point sections 20, 21 of the guide elements 6, 7 can already be inserted at least partially into the through holes 10.

The bearing sections 20, 21 of the guide elements 6, 7 are designed in such a way that they can be connected to the through holes 10 or bearings 10. A first connection area 22 or a second connection area 23 is arranged on each bearing point section 20, 21.

Preferably, the bearing sections 20, 21 of one guide element 6, 7 each have the first connection area 22 and the bearing sections 20, 21 of the other guide element 6, 7 each have the second connection area 23.

Furthermore, coupling areas 12, 13 are provided, whereby in FIG. 2 only a first coupling area 12 and a second coupling area 13 are recognisable by the illustration. Analogous to the through holes 10 or bearings 10, the coupling areas 12, 13 are each formed from a first coupling section 44 and a second coupling section 45, the first coupling section 44 being formed on the first housing module part 39 and the second coupling section 45 being formed on the second housing module part 40. If the housing module 3 consisting of the first housing module part 39 and the second housing module part 40 is assembled, the housing module parts 39, 40 complement each other in such a way that the coupling section areas 44, 45 form the respective coupling section 12, 13.

The guide elements 6, 7 are rotatably mounted in the bearings 10, the first guide element 6 being rotatable about a first rotation axis 4 and the second guide element 7 being rotatable about a second rotation axis 5. Preferably, the first rotation axis 4 and the second rotation axis 5 are perpendicular to each other.

The control lever 2 cannot be shown in its full extent, so that it can have an additional portion which can be provided for better handling. Preferably, this portion is arranged at the second end 9 of control lever 2.

The control lever 2 also has a first end 8, the first end 8 preferably having a passage 46 into which a connecting rod 43 can be introduced to rotatably connect the first guide element 6 to the control lever 2.

The second guide element 9 is arranged between the first end 8 and the second end 9 of control lever 2. Preferably, a universal shaft bush 47 is provided, which is also connectable to the first guide element 6 by means of the connecting rod 43 and is connectable to the second guide element 7 in such a way that the universal shaft bush 47 can function as a guide in a guide slot of the second guide element 7. Likewise, it is preferably provided that the universal shaft bush 47 is connectable to the control lever 2 by means of the connecting rod 43. Further preferably, the universal shaft bush 47 may have a mounting into which the control lever 2 is insertable, the mounting preferably being complementary to the configuration of the control lever, at least with respect to the first end 8.

A spring is further preferably provided, which is operatively connected on the one hand to the drive shaft bushing 47 and on the other hand to the control lever 2. In this case, the spring is installed pre-tensioned so that a spring force acts between the universal shaft bush 47 and the control lever 2, so that external force effects on the control lever 2 cannot act directly and completely on the connecting rod 43, so that a protective function is provided here.

A magnet 49 is also preferably provided, which can also exert a counterforce on the control lever 2, whereby the magnet is preferably connected to the universal shaft bush 47. Particularly preferably, the control lever 2 has a counter magnet at its lower end 8, the polarity of which is opposite to that of the magnet 49.

Figure 3:
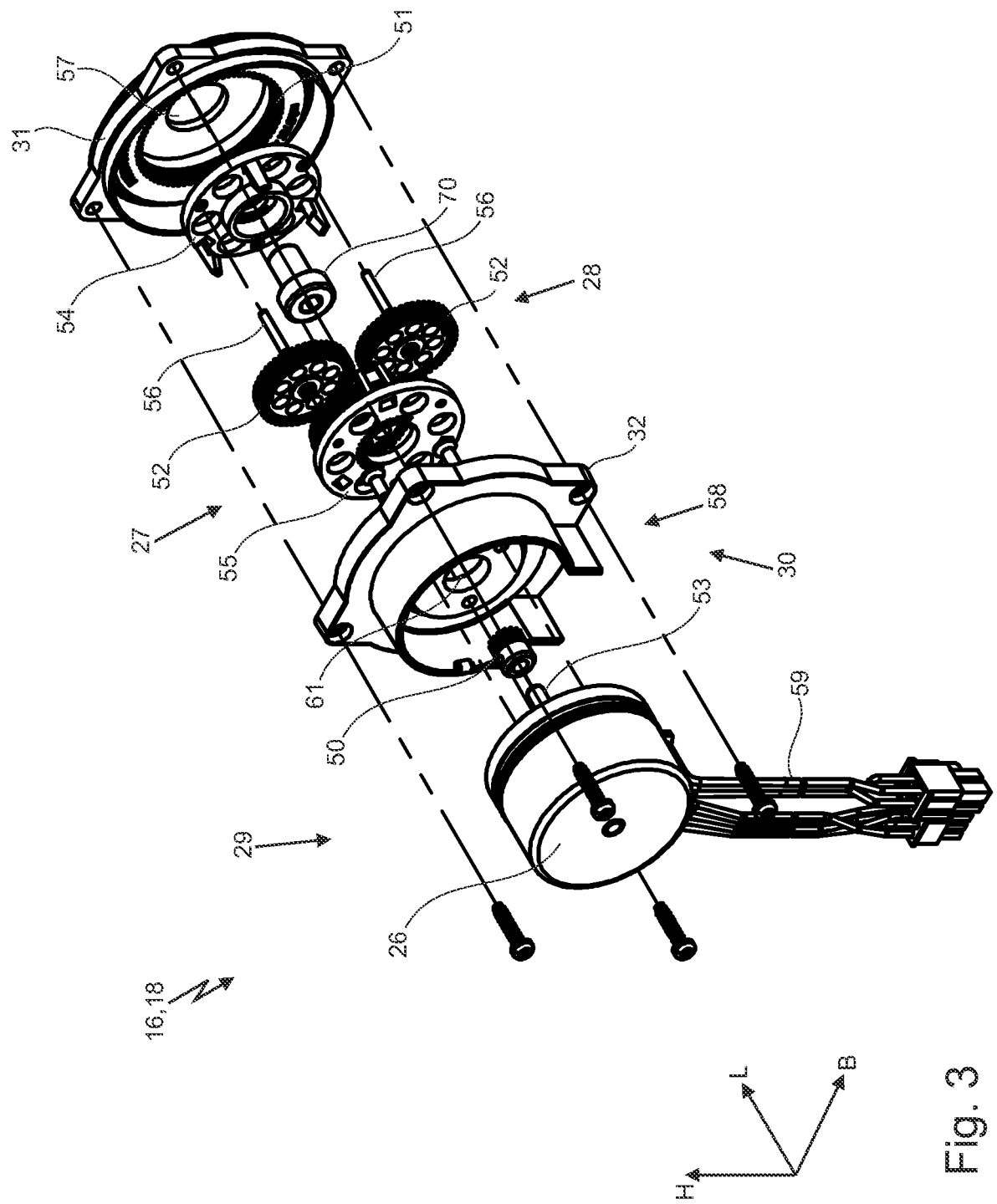
FIG. 3 Exploded view of the actuator module of the control device.

FIG. 3 shows an additional module 16 which is designed as an actuator module 18.

The actuator module 18 comprises a drive unit 26 and an output unit 27, whereby the drive unit 26 is preferably designed as an electric motor 29 and the output unit 27 as a planetary gear 28. Likewise, the actuator module 18 comprises an actuator module housing 30 comprising a first actuator module housing part 31 and a second actuator module housing part 32.

Preferably, the planetary gear 28 comprises a rotatably mounted sun gear 50, a ring gear 51 radially surrounding the sun gear 50, and a plurality of, preferably three, planetary gears 52 radially arranged between the sun gear 50 and the ring gear 51 and toothed therewith. Preferably, the sun gear 50 is arranged in alignment with one of the axes of rotation 4, 5 and is mounted so as to be rotatable about it.

Preferably, the ring gear 51 is mounted in a fixed position; the output is therefore preferably not via the ring gear 51. The ring gear 51 is preferably formed as a part of the first actuator module housing 31.

In this way, the ring gear 51 is designed to be non-rotatable with respect to the actuator module 18, so that the radial position of the ring gear 51 is fixed with respect to a remainder of the actuator module 18.

Preferably, the drive takes place via a shaft of the electric motor 53 or motor (motor shaft) and via the sun gear 51, whereby a centre axis of the shaft 53 of the electric motor 29 is preferably aligned with a centre axis of the sun gear 51. Further preferably, the shaft 53 of the motor 29 is in mechanical engagement with the sun gear 51 so that a torque of the motor 29 can be transmitted to the sun gear 51; preferably, the shaft 53 and the sun gear 51 are rigidly connected to each other. Thus, in particular, a rotation of the motor axis can be transferred to a rotation of the sun gear 51 that is in the same direction and identical in terms of speed. The planetary gears 52 are supported by means of a support element consisting of a first support element part 54 and a second support element part 55, whereby preferably the support element for each planetary gear 52 comprises a rotary shaft 56 by means of which the respective planetary gear 52 is rotatably connected.

The support element and in particular the first support element part 54 forms a first additional module connection 24 or second additional module connection 25, which can be connected to the corresponding complementary connection area 22, 23 of the guide elements 6, 7. For this purpose, a first connection area 57 of the first actuator module housing part 31 is preferably provided, through which the connection between the connection area 22, 23 and the additional module connection 24, 25 can extend.

Further preferably, the output unit 27 is provided in an interior of the actuator module housing 30. Preferably, the drive unit 26 is arranged outside the actuator module housing part 30, wherein preferably the second actuator module housing part 32 has a mounting 58 which is at least partially complementary to the drive unit 27 or the electric motor 29 and is intended to receive the electric motor 29, preferably securely to prevent it from falling out.

The electric motor 29 preferably has an electrical connection 59 for operating the electric motor 29, whereby the mounting 58 is preferably designed to receive the electrical connection 59. Preferably, the mounting 58 has a downward opening part 60 which can receive the electrical connection 59.

The second actuator module housing part 32 has a second passage 61 through which the motor shaft 52 and/or the sun gear 51 can extend.

Preferably, a gearbox mounting 70 is provided, which is particularly preferably in the form of a screw element. By means of the gear fastening 70, it is possible to connect the first support element part 54 and the respective connection area 22, 23 to each other, at least in an effective manner. The screw head of the gear fastening 70 serves in particular as a counter bearing to the first support element part 54.

Figure 4:
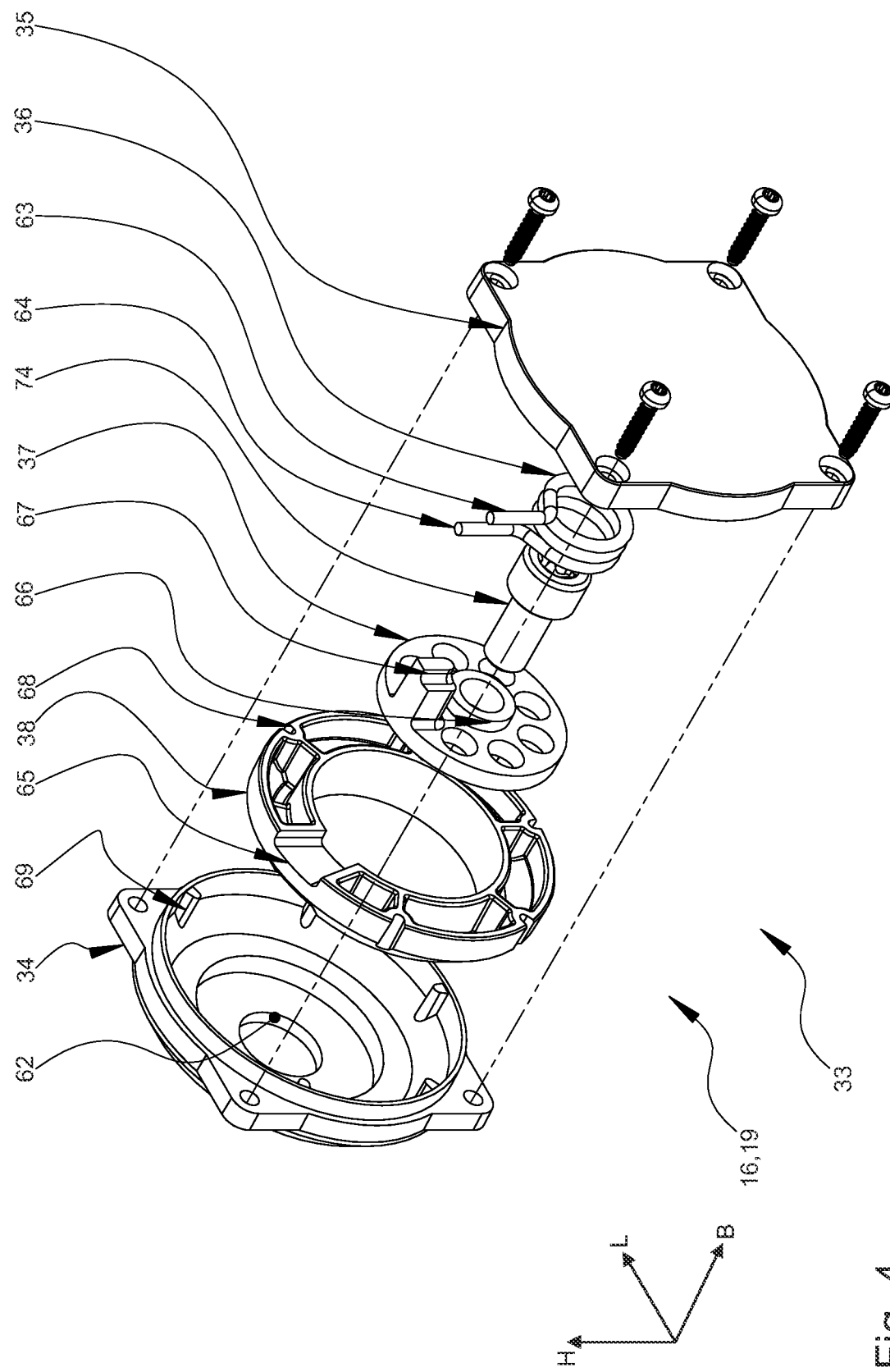
FIG. 4 Reset module of the control device in an exploded view.

FIG. 4 shows a further additional module 16, which is designed as a reset module 19.

According to a preferred embodiment, the reset module 19 comprises a reset module housing 33, wherein the reset module housing 33 is formed from a first reset module housing part 34, which is connectable to the housing module 3, and a second reset module housing part 35, wherein the reset module 19 comprises a torsion spring element 36, a torsion spring element carrier 37 which is rotatable relative to the reset module housing 33, and a torsion spring element base 38 which is arranged stationary relative to the reset module housing 33, wherein the torsion spring element 36 is connected to the torsion spring element carrier 37 and the torsion spring element base 38.

A rotation of the torsion spring element support 37 relative to the torsion spring element base 38 deflects the torsion spring element 36, thereby generating a spring force which can be transmitted to one of the guide elements 6, 7.

The torsion spring element support 37 preferably comprises the first additional module connection area 24 or the second additional module connection area 25, which can be connected to the first connection area 22 or the second connection area 23, the connection between the additional module connection area 24, 25 and the connection area 22, 23 extending through a third passage 62 of the reset module 19, in particular of the reset module housing 33.

Particularly preferably, the torsion spring element support 37 is connectable to one of the guide elements 6, 7. Further preferably, the torsion spring element support 37 is connected to one of the guide elements 6, 7 by means of a screw element 74, whereby further preferably the head of the screw element 74 can serve as a central shaft in order to be able to arrange the torsion spring element 36 in its position.

Preferably, the torsion spring element 36 is a leg spring, although other types of torsion springs are also conceivable.

This makes it easy to provide a reset module 19 which has all the necessary components to apply a force to an axis of rotation. Since the reset module can be connected to the housing module and the control lever, only the reset module has to be removed if it is defective.

The torsion spring element 36 preferably has a first end 63 and a second end 64, the first end 63 preferably being at least operatively connected to the torsion spring element base 38 and the second end being at least operatively connected to the torsion spring element support 37. The torsion spring element base 38 has a recess 65 which has an extension in the circumferential direction of the torsion spring element base 37 and in the longitudinal direction L, so that the first end 63 is received in this recess 65.

Preferably, the torsion spring element base 38 is circular, wherein further preferably the torsion spring element support 37 is configured to be at least partially enclosed by the torsion spring element base 38 so that the torsion spring element base 38 can at least partially receive the torsion spring element support 37 so that a more compact design is possible.

The torsion spring element base 38 has circumferential notches 68 which can be connected to projections 69 of the first reset module housing part 34. Particularly preferably, the notches 68 and the projections 69 are complementary to each other. It is also conceivable that the torsion spring element base 38 comprises the projections 69 and the first reset module housing part 34 comprises the notches 68.

Further preferably, the torsion spring element support 37 has a torsion spring retainer 66 on which the torsion spring element 36 can be arranged. Further preferably, the torsion spring element carrier 37 comprises a torsion spring abutment 67 which is connectable to the second end 64 of torsion spring element 36.

The torsion spring element 36, the torsion spring element base 38 and the torsion spring element support 37 are preferably arranged within the reset module housing 33.

Preferably, the second reset module housing part 35 serves as a cover member for closing the reset module housing 35 to the outside.

Various positions of the control device 1 are shown in FIG. 5, whereby possible arrangements of additional modules 16, 18, 19 and housing module 3 are shown in accordance with the embodiment shown. Preferably, two actuator modules 18 and two reset modules 19 are provided, whereby one actuator module 18 and one reset module 19 are assigned to each axis of rotation 4, 5. Depending on the space available when installing a control device 1, the additional modules 16, 18, 19 can be arranged differently on the housing module 3.

In principle, the housing module 3 can be provided with any combination of additional modules 16, whereby all combinations are conceivable, from:

No actuator module 18, one actuator module 18, two actuator modules 18;

No reset module 19, one reset module 19, two reset modules 19;

If no additional module 16, 18, 19 is provided in at least one position, this position can be covered with the blind cover 71;

Any combination of the above.

This means that, for example, no actuator module 18 and no reset module 19 can be provided, or one actuator module 18 and no reset module 19, or two actuator modules 18 and no reset module 19, two actuator modules 18 and one reset module 19, two actuator modules 18 and two reset modules 19.

Particularly preferably, each guide element 6, 7 can be connected to at most one actuator module 18 and at most one reset module 19.

All features disclosed in the application documents are claimed to be inventive insofar as they are individually or in combination new compared to the prior art.

REFERENCE LIST 1 control device
2 control lever
3 housing module
4 first rotation axis
5 second rotation axis
6 first guide element
7 second guide element
8 first end of control lever
9 second end of control lever
10 through hole, bearing
11 outer side
12 first coupling area
13 second coupling area
16 additional module
16' first additional module
16" second additional module
16"' third additional module
16"" fourth additional module
17 complementary area
18 actuator module
19 reset module
20 first bearing section
21 second bearing section
22 first connection area
23 second connection area
24 first additional module connection area
25 second additional module connection area
26 drive unit
27 output unit
28 planetary gear
29 electric motor
30 actuator module housing
31 first actuator module housing part
32 Second actuator module housing part
33 Reset module housing
34 first reset module housing part
35 second reset module housing part
36 torsion spring element
37 torsion spring element support
38 torsion spring element base
39 first housing module part
30 second housing module part
41 screw
42 through hole section
43 connecting rod
44 first coupling section
45 second coupling section
46 passage
47 universal shaft bush
49 magnet
50 sun gear
51 ring gear
52 planetary gear
53 motor shaft
54 first support element part
55 second support element part
56 rotary shaft
57 first passage
58 mounting
59 electrical connection
60 downward opening part
61 second passage
62 third passage
63 first end of torsion spring element
64 second end of torsion spring element
65 recess
66 torsion spring retainer
67 torsion spring abutment
68 notch
69 projection
70 gearbox mounting
71 blind cover
72 sensor
73 lower cover element; PCBA
74 screw element
L longitudinal direction
B width direction
H height direction

The invention claimed is:

1. A control device for operating at least one actuator of a vehicle, the control device comprising a deflectable control lever and a housing module, wherein a first guide element rotatable about a first rotation axis and a second guide element rotatable about a second rotation axis are provided, wherein the first guide element is arranged at a first end of the control lever and the second guide element is arranged between the first end and a second end of the control lever, wherein the housing module has at least two through holes, which are each designed as bearings for supporting the guide elements, so that the guide elements can be contacted from outside the housing module, wherein the housing module has a first coupling area on an outer side, wherein the first coupling area comprises a bearing of the bearings and the first coupling area is designed and provided to receive an additional module, which comprises an area formed at least partially complementary to the first coupling area, in such a way that the additional module can be functionally connected to the guide element, wherein the additional module is an actuator module being designed to apply a torque to the first rotation axis or the second rotation axis, wherein the actuator module comprises a drive unit and an output unit, the actuator module forming a motor-gearbox combination, wherein the actuator module comprises an actuator module housing, the actuator module housing being formed from a first actuator module housing part, which can be connected to the housing module, and a second actuator module housing part, and wherein the output unit is received inside the actuator module housing and the drive unit is arranged outside the actuator module housing on the second actuator housing part.

2. The control device according to claim 1, further comprising a reset module, the reset module being designed to apply a force to the first rotation axis or the second rotation axis that counteracts a deflection of the control lever.

3. The control device according to claim 2, wherein the output unit is formed by a planetary gear and the drive unit is formed as an electric motor.

4. The control device according to claim 2, wherein the reset module comprises a reset module housing, the reset module housing being formed from a first reset module housing part, which can be connected to the housing module, and a second reset module housing part, the reset module having a torsion spring element, and a torsion spring element support rotatable relative to the reset module housing and a torsion spring element base arranged stationary relative to the reset module housing, and wherein the torsion spring element is at least operatively connected to the torsion spring element support and the torsion spring element base.

5. The control device according to claim 1, wherein the guide elements each have a first bearing section and a second bearing section, the first bearing section of a guide element comprising a first connection area and the second bearing section of a guide element comprising a second connection area.

6. The control device according to claim 5, wherein the additional module comprises a first additional module connection area which is complementary to the first connection area or comprises a second additional module connection area which is complementary to the second connection area.

7. The control device according to claim 1, wherein the at least two through holes comprises a first through hole, a second through hole, a third through hole, and a fourth through hole, wherein the housing module further comprises a second coupling area, a third coupling area, and a fourth coupling area, wherein each of the second coupling area, the third coupling area, and the fourth coupling area comprises a bearing, wherein the first rotation axis extends through the first through hole and the second through hole disposed on opposite sides of the housing module, and wherein the second rotation axis extends through the third through hole and the fourth through hole disposed on opposite sides of the housing module.

8. The control device according to claim 1, wherein the first rotation axis and the second rotation axis are perpendicular to each other.

* * * * *